(12) United States Patent  
Matsumoto et al.

(10) Patent No.: US 8,291,697 B2  
(45) Date of Patent: Oct. 23, 2012

(54) INTERNAL COMBUSTION ENGINE CONTROL DEVICE

(75) Inventors: Isao Matsumoto, Suntou-gun (JP); Takenori Saoda, Susono (JP); Naofumi Magarida, Susono (JP); Hiroki Murata, Gotenba (JP); Akira Yamashita, Susono (JP); Hiroyuki Haga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 354 days.

(21) Appl. No.: 12/450,191

(22) PCT Filed: Apr. 4, 2008

(86) PCT No.: PCT/IB2008/000812  
§ 371 (c)(1),  
(2), (4) Date: Sep. 15, 2009

(87) PCT Pub. No.: WO2008/122866  
PCT Pub. Date: Oct. 16, 2008

(65) Prior Publication Data  
US 2010/0018187 A1  Jan. 28, 2010

(30) Foreign Application Priority Data

Apr. 6, 2007  (JP) ................................ 2007-100080  
May 11, 2007  (JP) ................................ 2007-127128

(51) Int. Cl.  
*F01N 3/00*  (2006.01)
(52) U.S. Cl. .......................................... 60/295; 60/278
(58) Field of Classification Search ............... 60/278, 60/286, 295, 301  
See application file for complete search history.

(56) References Cited

U.S. PATENT DOCUMENTS

| | | | |
|---|---|---|---|
| 2001/0015193 A1* | 8/2001 | Tanaka et al. | 123/300 |
| 2002/0011066 A1* | 1/2002 | Takakura et al. | 60/277 |
| 2002/0073696 A1* | 6/2002 | Kuenstler et al. | 60/295 |
| 2002/0175011 A1* | 11/2002 | Nogi et al. | 180/65.4 |
| 2003/0150425 A1  | 8/2003 | Adler et al. | |
| 2007/0006574 A1* | 1/2007 | Nakano | 60/285 |
| 2007/0044752 A1* | 3/2007 | Tamma et al. | 123/299 |
| 2008/0295514 A1* | 12/2008 | Ono | 60/602 |

FOREIGN PATENT DOCUMENTS

| | | |
|---|---|---|
| DE | 199 14 787 A1 | 10/1999 |
| DE | 100 26 806 C1 | 9/2001 |
| EP | 0 732 485 A2 | 9/1996 |

(Continued)

*Primary Examiner* — Thomas Denion  
*Assistant Examiner* — Patrick Maines  
(74) *Attorney, Agent, or Firm* — Oliff & Berridge, PLC

(57) ABSTRACT

An internal combustion engine control device includes a NOx adsorber catalyst disposed in an exhaust passage, an EGR passage, a reducing agent adding device, a torque fluctuation reducing device, and a fuel injection device. The EGR passage draws a portion of exhaust gas from the exhaust passage downstream of the NOx adsorber catalyst and recirculates the exhaust gas into the intake passage. The reducing agent adding device adds a reducing agent to exhaust gas upstream of the NOx adsorber catalyst to reduce substances adsorbed by the NOx adsorber catalyst. When or after the reducing agent adding device adds the reducing agent, the torque fluctuation reducing device advances the timing of the fuel injection device or carries out a pilot injection to reduce a fluctuation in engine torque. The reducing agent adding device adds less reducing agent while the torque fluctuation reducing device is operating.

4 Claims, 5 Drawing Sheets

FOREIGN PATENT DOCUMENTS

| | | |
|---|---|---|
| EP | 0 997 617 A1 | 5/2000 |
| EP | 1 288 473 A2 | 3/2003 |
| JP | 2001234772 A * | 8/2001 |
| JP | A-2001-234772 | 8/2001 |
| JP | A-2005-69207 | 3/2005 |
| JP | A-2005-76456 | 3/2005 |
| JP | A-2007-162501 | 6/2007 |

* cited by examiner

INTERNAL COMBUSTION ENGINE CONTROL DEVICE

BACKGROUND OF THE INVENTION

1. Field of the Invention

The present invention relates to an internal combustion engine control device.

2. Description of the Related Art

Some internal combustion engines are provided with a turbocharger and a low-pressure EGR passage for drawing a portion of exhaust gas as low-pressure EGR gas from the exhaust passage downstream of the turbine of the turbocharger and downstream of a NOx adsorber catalyst (which is hereinafter referred to simply as "NOx catalyst") into the intake passage upstream of the compressor of the turbocharger. Such internal combustion engines are also provided with a high-pressure EGR passage for recirculating a portion of exhaust gas as high-pressure EGR gas from the exhaust passage upstream of the turbine and recycling the high-pressure EGR gas into the intake passage downstream of the compressor. A technology for controlling the amount of low-pressure EGR gas flowing through the low-pressure EGR passage and the amount of high-pressure EGR gas flowing through the high-pressure EGR passage based on the required engine load during low-temperature combustion is described in JP-A-2005-076456.

In the structure in which the low-pressure EGR gas is drawn from the exhaust passage downstream of the NOx catalyst, when a rich spike, i.e. a process of adding fuel as a reducing agent to the exhaust gas upstream of the NOx catalyst to reduce NOx and SOx adsorbed by the NOx catalyst, is performed, the oxygen concentration in the low-pressure EGR gas that is recirculated to the intake passage suddenly changes and the combustion in the internal combustion engine becomes unstable. To reduce the fluctuation in torque of the internal combustion engine, the timing of main fuel injection from fuel injection valves for injecting fuel into the cylinders of the internal combustion engine may be advanced or a pilot injection carried out. However, as described above, if a rich spike is carried out during the process of reducing a fluctuation in torque of the internal combustion engine, the fluctuation in torque increases to an uncontrollable level and the combustion in the internal combustion engine becomes unstable. Also, if the fluctuation in torque of the internal combustion engine is reduced as described above, the internal combustion engine produces a larger amount of smoke and undesirable combustion noise.

SUMMARY OF THE INVENTION

The present invention provides an internal combustion engine control device that reduces fluctuation in torque more effectively when a rich spike is performed.

An internal combustion engine control device according to a first aspect of the present invention includes an occlusion-reduction type NOx catalyst disposed in an exhaust passage of the internal combustion engine, an EGR passage, a reducing agent adding device, a torque fluctuation reducing device, and a fuel injection device for injecting fuel into the cylinders of the internal combustion engine. The EGR passage draws a portion of exhaust gas from the exhaust passage, downstream of the NOx adsorber catalyst, and recirculates the exhaust gas into the intake passage of the internal combustion engine. The reducing agent adding device adds a reducing agent to exhaust gas upstream of the NOx adsorber catalyst to reduce adsorbed substances such as NOx and SOx. When or after the reducing agent is added, the torque fluctuation reducing device advances the timing of main fuel injection or carries out a pilot injection to reduce a fluctuation in torque of the internal combustion engine. The reducing agent adding device reduces the amount of reducing agent that is added while the torque fluctuation reducing device is reducing the fluctuation in torque of the internal combustion engine.

In the structure in which the EGR gas is drawn from the exhaust passage downstream of the NOx adsorber catalyst, when a rich spike, i.e. a process of adding a reducing agent to the exhaust gas upstream of the NOx adsorber catalyst to reduce adsorbed substances such as SOx and NOx, is performed, the oxygen concentration in the EGR gas that is recirculated to the intake passage suddenly changes and the combustion in the internal combustion engine becomes unstable, resulting in a decrease in torque of the internal combustion engine. Thus, the timing of main fuel injection is advanced or a pilot injection is carried out to reduce the fluctuation (decrease) in torque of the internal combustion engine (the device that performs the operation is hereinafter referred to as "torque fluctuation reducing device"). However, if a rich spike is carried out while the torque fluctuation reducing device is reducing a fluctuation in torque of the internal combustion engine, the fluctuation in torque increases and the combustion in the internal combustion engine becomes unstable.

Thus, in this aspect, while torque fluctuation reducing device is reducing a fluctuation in torque of the internal combustion engine, the amount of reducing agent that is added is reduced to reduce the rich spike amount. Because the magnitude of fluctuation in torque of the internal combustion engine may be decreased by reducing the rich spike amount, the fluctuation in torque is reduced effectively.

The internal combustion engine control device of the first aspect may further include an inhibiting device to inhibit the reducing agent adding device from adding the reducing agent. In this case, the torque fluctuation reducing device may reduce the fluctuation in torque of the internal combustion engine after the reducing agent adding device has added the reducing agent, and the inhibiting device may inhibit the reducing agent adding device from adding the reducing agent while the torque fluctuation reducing device is reducing the fluctuation in torque of the internal combustion engine.

According to the above, because addition of the reducing agent is inhibited while the torque fluctuation reducing device is reducing a fluctuation in torque of the internal combustion engine, there is no possibility that the additional reducing agent is added to increase the fluctuation in torque. Thus, the fluctuation in torque of the internal combustion engine may be reduced by the torque fluctuation reducing device and the combustion in the internal combustion engine is stabilized.

The internal combustion engine control device of the first aspect may further include an electric motor to supplement the torque of the internal combustion engine, and a controller. If the exhaust gas is recirculated using the EGR passage and the reducing agent adding device adds the reducing agent, the controller may i} reduce the amount of the reducing agent that is added by the reducing agent adding device, ii} decrease the degree to which the torque fluctuation reducing device reduces a fluctuation in torque, iii} reduce the amount of intake air that is supplied to the internal combustion engine, and iv} cause the electric motor to compensate for the decrease in torque of the internal combustion engine from the state prior to the addition of the reducing agent.

According to the above, because the amount of reducing agent added by the reducing agent adding device during a rich spike is decreased to prevent a sudden change in oxygen concentration in the exhaust gas that is recirculated into the intake passage, unstable combustion in the internal combustion engine is prevented and the degree of decrease in torque resulting from addition of reducing agent is reduced. Because the degree of decrease in torque may be reduced as described above, the torque of the internal combustion engine is stabilized even when the degree by which a fluctuation in torque is reduced is decreased. As a result, an increase of smoke from the internal combustion engine and undesirable combustion noise resulting from the reduction of a fluctuation in torque made by the torque fluctuation reducing device is prevented.

However, if the amount of reducing agent that is added during a rich spike is reduced, the amount of fuel that reaches the NOx adsorber catalyst decreases, which reduces the purge efficiency in reducing the adsorbed from the NOx adsorber catalyst. Thus, when the amount of reducing agent that is added during a rich spike is reduced, the amount of intake air that is supplied to the internal combustion engine is also reduced to decrease the flow rate of the exhaust gas flowing into the NOx catalyst and to decrease the air-fuel ratio of the exhaust gas. As a result, a desirable purge efficiency may be maintained in the NOx catalyst even with a reduced amount of reducing agent.

In addition, the supplement from the electric motor compensates for the actual decrease in torque of the internal combustion engine from a steady state. Thus, the total torque does not decrease even during the rich spike.

In the above aspect, the controller may control a first torque decrease in which the controller reduces the torque output of the internal combustion engine by decreasing the amount of reducing agent added by the reducing agent adding device; a second torque decrease in which the controller decreases a degree to which the torque fluctuation reducing device reduces fluctuation in torque of the internal combustion engine; and a third torque decrease in which the controller decreases the amount of intake air supplied to the internal combustion engine such that the sum of the first, second and third torque decreases is equal to or smaller than a torque decrease threshold value, which is the maximum amount by which the torque may be decreased without causing a torque shock. Also, the controller may drive the electric motor to compensate for the total torque decrease.

The threshold value of torque decrease is a limit of decrease in torque and a torque shock occurs when the decrease in torque exceeds it. The above sum is equal to or smaller than the threshold value of torque decrease, and no torque shock occurs even when the controller performs the control operation to decrease the torque. Also, because the motor compensate for the torque corresponding to the sum of the decreases in torque, the total torque is maintained.

According to the above aspect, the fluctuation in torque may be reduced more effectively when a rich spike is performed in an internal combustion engine control device. In addition, when a rich spike is performed, a desirable NOx adsorber catalyst purge efficiency may be maintained and a decrease in torque of the internal combustion engine may be compensated without increasing the amount of smoke from the internal combustion engine and undesirable combustion noise.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
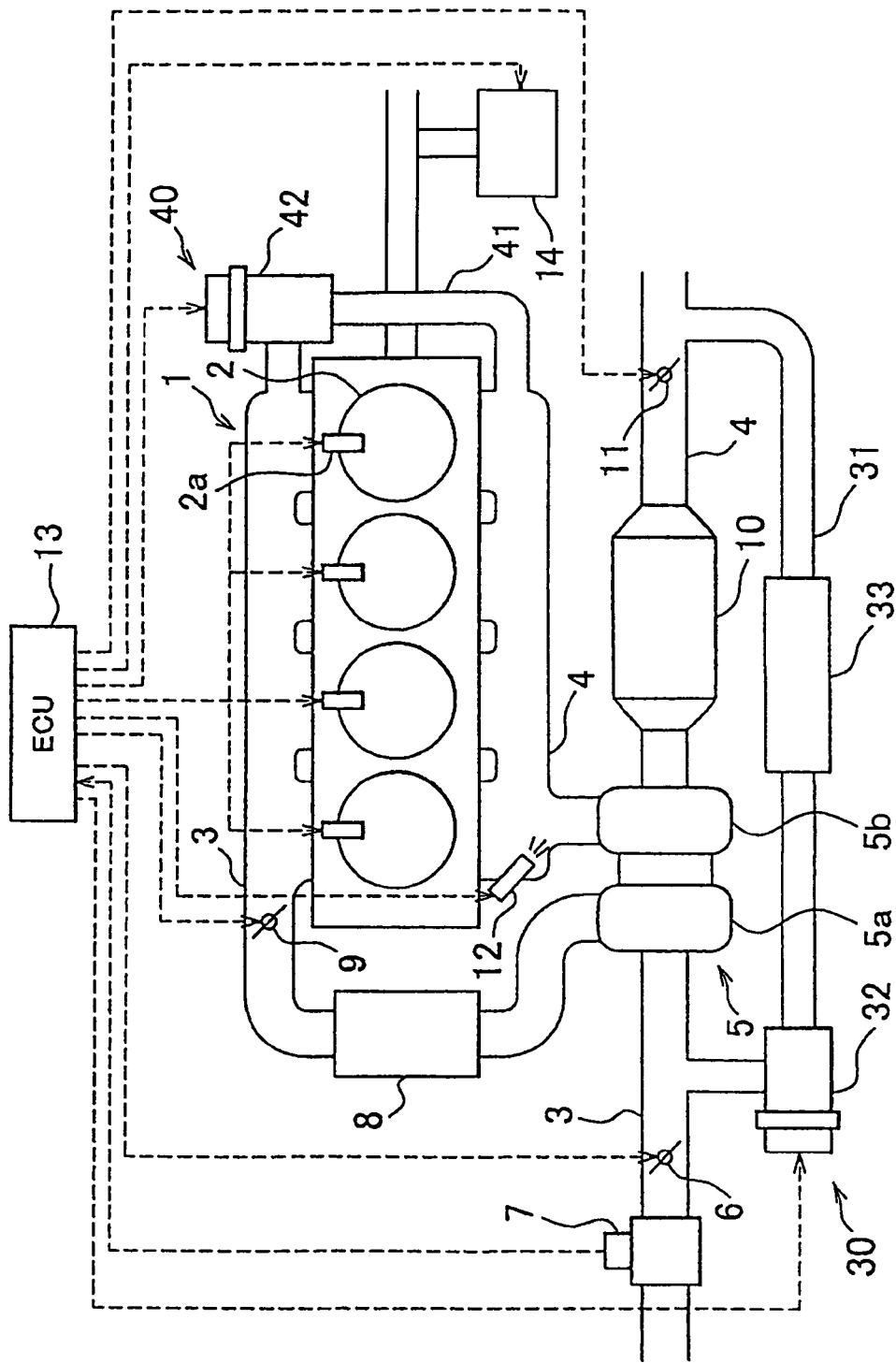
FIG. 1 is a view illustrating the general configuration of an internal combustion engine and its intake and exhaust systems according to first and second embodiments.

FIG. 1 is a view illustrating the general configuration of an internal combustion engine to which an internal combustion engine control device according to this embodiment is applied and its intake and exhaust systems. An internal combustion engine 1 shown in FIG. 1 is a water-cooled four-stroke-cycle diesel engine having four cylinders 2. Each cylinder 2 is provided with a fuel injection valve 2a. The fuel injection valves 2a of this embodiment function as the fuel injection device of the present invention. An intake passage 3 and an exhaust passage 4 are connected to the internal combustion engine 1.

A compressor housing 5a of a turbocharger 5, which operates using energy of exhaust gas as the driving source, is located in the intake passage 3. A first throttle valve 6 for adjusting the flow rate of intake air flowing through the intake passage 3 is provided in the intake passage 3 upstream of the compressor housing 5a. The first throttle valve 6 is actuated by an electric actuator. An air flow meter 7 for outputting a signal corresponding to the flow rate of fresh intake air (which is hereinafter referred to as "fresh air") flowing through the intake passage 3 is provided in the intake passage 3 upstream of the first throttle valve 6. The amount of fresh air to the internal combustion engine 1 is measured by the air flow meter 7.

An intercooler 8 that exchanges heat between intake air and ambient air is located in the intake passage 3 downstream of the compressor housing 5a. A second throttle valve 9 that adjusts the flow rate of intake air flowing through the intake passage 3 is provided in the intake passage 3 downstream of the intercooler 8. The second throttle valve 9 is actuated by an electric actuator.

A turbine housing 5b of the turbocharger 5 is located in the exhaust passage 4. An exhaust emission control system 10 is provided in the exhaust passage 4 downstream of the turbine housing 5b.

The exhaust emission control system 10 includes an oxidation catalyst and a particulate filter (which is hereinafter referred to simply as "filter") disposed downstream of the oxidation catalyst. A NOx adsorber catalyst (which is hereinafter referred to simply as "NOx catalyst") is supported on the filter.

An exhaust throttle valve 11 for adjusting the flow rate of exhaust gas flowing through the exhaust passage 4 is disposed in the exhaust passage 4 downstream of the exhaust emission control system 10. The exhaust throttle valve 11 is actuated by an electric actuator.

A fuel addition valve 12 that adds fuel as a reducing agent to exhaust gas is disposed in the exhaust passage 4 upstream of the turbine housing 5b of the turbocharger 5. The addition of fuel from the fuel addition valve 12 is intended to reduce NOx and SOx adsorbed by the NOx catalyst. The addition of fuel [This has already been established.] to decrease the air-fuel ratio of exhaust gas to stoichiometric or rich side in order to reduce NOx and SOx adsorbed in the NOx catalyst of the exhaust emission control system 10 is referred to as "rich spike." The fuel addition valve 12 functions as the reducing agent addition device of the present invention. A post injection may be carried out to add fuel to exhaust gas using the fuel injection valves as the reducing agent adding device.

The internal combustion engine 1 is provided with a low-pressure EGR device 30 that recirculates a portion of the exhaust gas flowing through the exhaust passage 4 into the intake passage 3 at low pressure. The low-pressure EGR device 30 includes a low-pressure EGR passage 31, a low-pressure EGR valve 32, and a low-pressure EGR cooler 33.

The low-pressure EGR passage 31 connects the exhaust passage 4 downstream of the exhaust emission control system 10 and downstream of the exhaust throttle valve 11 with the intake passage 3 upstream of the compressor housing 5a and downstream of the first throttle valve 6. A portion of the exhaust gas is fed into the internal combustion engine 1 through the low-pressure EGR passage 31 at low pressure. In this embodiment, the exhaust gas that is recirculated through the low-pressure EGR passage 31 is referred to as "low-pressure EGR gas." The low-pressure EGR passage 31 functions as the EGR passage of the present invention.

The low-pressure EGR valve 32 adjusts the cross-sectional area of the low-pressure EGR passage 31 to adjust the amount of the low-pressure EGR gas flowing through the low-pressure EGR passage 31. The amount of low-pressure EGR gas may be adjusted by a means other than adjusting the opening of the low-pressure EGR valve 32. For example, the amount of the low-pressure EGR gas may be adjusted by adjusting the opening of the first throttle valve 6 to vary the pressure difference between upstream and downstream of the low-pressure EGR passage 31.

The low-pressure EGR cooler 33 provides heat exchange between the low-pressure EGR gas passing therethrough and engine coolant of the internal combustion engine 1 to lower the temperature of the low-pressure EGR gas.

The internal combustion engine 1 is also provided with a high-pressure EGR device 40 that recirculates a portion of the exhaust gas flowing through the exhaust passage 4 into the intake passage 3 at high pressure. The high-pressure EGR device 40 includes a high-pressure EGR passage 41 and a high-pressure EGR valve 42.

The high-pressure EGR passage 41 connects the exhaust passage 4 upstream of the turbine housing 5b with the intake passage 3 downstream of the compressor housing 5a. A portion of the exhaust gas is fed into the internal combustion engine 1 through the high-pressure EGR passage 41 at high pressure. In this embodiment, the exhaust gas that is recirculated through the high-pressure EGR passage 41 is referred to as "high-pressure EGR gas."

The high-pressure EGR valve 42 adjusts the cross-sectional area of the high-pressure EGR passage 41 to adjust the amount of the high-pressure EGR gas flowing through the high-pressure EGR passage 41. The amount of the high-pressure EGR gas may be adjusted by a means other than adjusting the opening of the high-pressure EGR valve 42. For example, the amount of the high-pressure EGR gas may be adjusted by adjusting the opening of the second throttle valve 9 to vary the pressure difference between upstream and downstream of the high-pressure EGR passage 41. If the turbocharger 5 is a variable geometry turbocharger, the amount of the high-pressure EGR gas may also be adjusted by adjusting the opening of nozzle vanes to change the flow characteristics of the turbine.

The internal combustion engine 1 configured as described above is provided with an ECU 13 as an electronic control unit for controlling the internal combustion engine 1. The ECU 13 controls the operating state of the internal combustion engine 1 based on the operating conditions of the internal combustion engine 1 and inputs from the driver.

Various sensors such as the air flow meter 7 may be connected to the ECU 13 via electric wires and output signals from the sensors are input to the ECU 13.

The actuators for the fuel injection valves 2a, the first throttle valve 6, the second throttle valve 9, the exhaust throttle valve 11, the fuel addition valve 12, the low-pressure EGR valve 32 and the high-pressure EGR valve 42 may be connected to the ECU 13 via electric wires and controlled by the ECU 13.

In the structure of this embodiment, in which the low-pressure EGR gas is drawn from the exhaust passage 4 downstream of the exhaust emission control system 10 using the low-pressure EGR passage 31, a rich spike, i.e., a process of adding fuel to the exhaust gas upstream of the exhaust emission control system 10 from the fuel addition valve 12 is performed to to reduce NOx and SOx adsorbed by the NOx catalyst. When a rich spike is performed while the low-pressure EGR gas is being recirculated, the oxygen concentration in the low-pressure EGR gas that is recirculated to the intake passage 3 changes suddenly and the combustion in the internal combustion engine 1, to which the low-pressure EGR gas is being supplied, becomes unstable, resulting in a decrease in torque of the internal combustion engine 1. Thus, the timing of main fuel injection from the fuel injection valves 2a is advanced or a pilot injection is carried out to reduce a fluctuation (decrease) in torque of the internal combustion engine 1. This process is hereinafter referred to as "torque fluctuation reducing operation." The ECU 13, which performs the torque fluctuation reducing operation, functions as the torque fluctuation reducing device of the present invention.

However, as described above, when a rich spike is continued while the torque fluctuation reducing operation is performed, the fluctuation in torque increases to such an extent that it cannot be controlled by the torque fluctuation reducing operation and the combustion in the internal combustion engine 1 becomes unstable.

Therefore, in the first embodiment, a rich spike is inhibited while the torque fluctuation reducing operation is being performed to reduce a fluctuation in torque of the internal combustion engine 1.

According to the above method, because a rich spike is inhibited while the torque fluctuation reducing operation is being performed, there is no possibility that additional fuel is added during a torque fluctuation reducing operation to increase the fluctuation in torque. Thus, the fluctuation in torque of the internal combustion engine 1 may be reduced by performing a torque fluctuation reducing operation and the combustion in the internal combustion engine 1 is stabilized.

Figure 2:
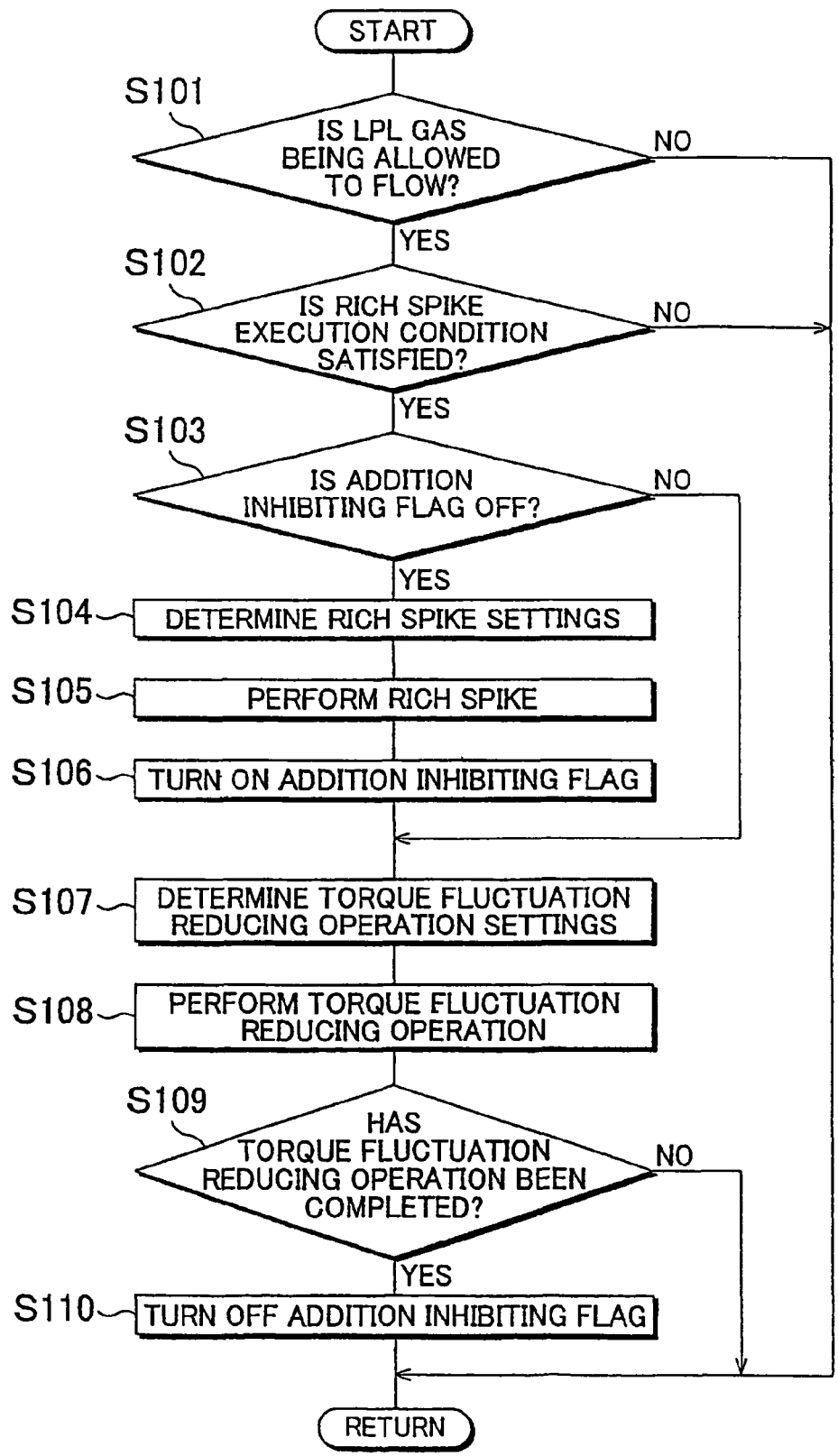
FIG. 2 is a flowchart of a control routine, which is executed when a rich spike is performed, according to the first embodiment.

The control routine, which is executed when a rich spike is performed, according to this embodiment is next described. FIG. 2 is a flowchart of the control routine, which is executed when a rich spike is performed, according to this embodiment. This routine is repeated at specified time intervals.

In step S101, the ECU 13 determines whether the flow of low-pressure EGR gas through the low-pressure EGR passage 31 is stopped by detecting whether the low-pressure EGR valve 32 is open with an opening sensor (not shown), and the opening amount of the low-pressure EGR valve 32.

If it is determined that the low-pressure EGR valve 32 is closed so as not to allow the low-pressure EGR gas to flow in step S101, the ECU 13 terminates the current routine. If it is determined that the low-pressure EGR valve 32 is open to allow the low-pressure EGR gas to flow, the routine proceeds to step S102.

In step S102, the ECU 13 determines whether the condition for execution of a rich spike is satisfied. It is determined that the condition for execution of a rich spike is satisfied when the NOx catalyst of the exhaust emission control system 10 has adsorbed NOx and SOx to its full capacity and needs NOx reduction treatment or SOx poisoning recovery treatment.

If it is determined that the condition for execution of a rich spike is not satisfied in step S102, the ECU 13 terminates the current routine. If it is determined that the condition for execution of a rich spike is satisfied, the routine proceeds to step S103.

In step S103, the ECU 13 determines whether an addition inhibiting flag is OFF. The addition inhibiting flag is a flag that inhibits a rich spike when it is ON and permits a rich spike when it is OFF.

Figure 3:
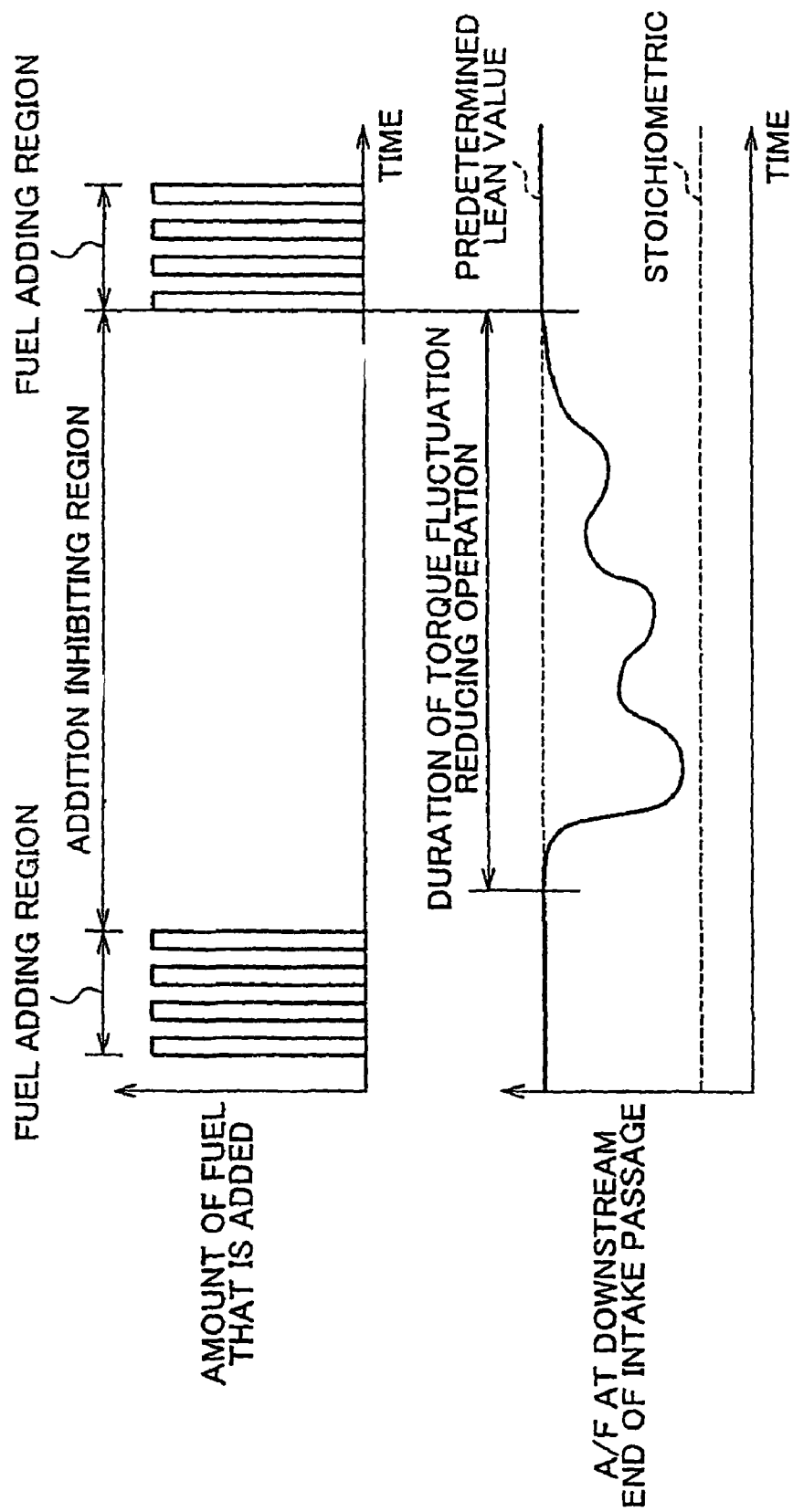
FIG. 3 is a view showing the relation between the executing states of a rich spike and a torque fluctuation reducing operation according to the first embodiment.

If it is determined that the addition inhibiting flag is ON in step S103, the ECU 13 proceeds to step S107 because the current state is in an addition inhibiting region shown in FIG. 3. If it is determined that the addition inhibiting flag is OFF, the routine proceeds to step S104 because the current state is in a fuel adding region shown in FIG. 3.

In step S104, the ECU 13 determines the settings for a rich spike. More specifically, the ECU 13 sets the additional amount of fuel added in each cycle during a rich spike and the number of addition cycles, i.e. the number of cycles over which the additional amount of fuel is to be added. The additional amount of fuel that is added and the number of addition cycles are set based on the operating state of the internal combustion engine and so on with reference to a combustion map that may be determined by empirical or other means. In this embodiment, additional fuel is added in predetermined equal amounts over four addition cycles as shown in FIG. 3, for example. When this step is completed, the routine proceeds to step S105.

In step S105, the ECU 13 performs a rich spike. The rich spike is performed based on the settings determined in step S104. In this embodiment, additional fuel is added in predetermined equal amounts in four addition cycles as shown in FIG. 3, for example. When this step is completed, the routine proceeds to step S106.

In step S106, the ECU 13 turns ON the addition inhibiting flag so as to inhibit the next rich spike. When this step is completed, the routine proceeds to step S107.

In step S107, the ECU 13 determines the settings for a torque fluctuation reducing operation. More specifically, the time delay after the rich spike needed for the enriched air fuel mixture to reach the internal combustion engine 1 through the low-pressure EGR passage 31 and the air-fuel ratio of the intake air at the most downstream end of the intake passage 3 (the air-fuel ratio during the torque fluctuation reducing operation shown in FIG. 3) are calculated with reference to a map that estimates a time for the exhaust gas to recirculate the internal combustion engine. Also, the oxygen concentration in intake air that is drawn into the internal combustion engine 1 at the most downstream end of the intake passage 3 is calculated from the delay time and the air-fuel ratio calculated as above, the amount of EGR gas and so on. Then, a fuel injection correction amount is calculated based on the oxygen concentration in the intake air calculated above. The fuel injection correction amount is the amount by which the timing of main fuel injection from the fuel injection valves is advanced, or the pilot injection amount in the case of performing a pilot injection, to perform a torque fluctuation reducing operation, and is calculated by inputting the oxygen concentration in the intake air into a stored combustion map. When this step is completed, the routine proceeds to step S108.

In step S108, the ECU 13 performs a torque fluctuation reducing operation. That is, the ECU 13 advances the timing of main fuel injection from the fuel injection valves or carries out a pilot injection. The torque fluctuation reducing operation is performed based on the settings determined in step S107. When this step is completed, the routine proceeds to step S109.

In step S109, the ECU 13 determines whether the torque fluctuation reducing operation has been completed. It is determined that the torque fluctuation reducing operation has been completed when a detected value from an A/F sensor (not shown) disposed at the most downstream end of the intake passage 3 to the internal combustion engine 1 is equal to a predetermined lean value in a steady state or when the fuel injection correction amount is calculated as 0 in determining the settings for a torque fluctuation reducing operation in step S107.

If it is determined that the torque fluctuation reducing operation has not been completed in step S109, the ECU 13 terminates the current routine. If it is determined that the torque fluctuation reducing operation has been completed, the routine proceeds to step S110.

In step S110, the ECU 13 turns OFF the addition inhibiting flag so as to permit the next rich spike. When this step is completed, the current routine is terminated. In this case, the next time that the routine is executed, the execution of the rich spike is permitted.

By executing the routine described above, the addition inhibiting flag is kept ON and a rich spike is inhibited during a torque fluctuation reducing operation to eliminate the possibility that additional fuel is added to increase a fluctuation in torque during the torque fluctuation reducing operation. Thus, the fluctuation in torque of the internal combustion engine 1 may be reduced by performing a torque fluctuation reducing operation and the combustion in the internal combustion engine 1 is stabilized.

On the other hand, as described above when a torque fluctuation reducing operation is performed, the internal combustion engine produces a larger amount of smoke and undesirable combustion noise.

Therefore, in a second embodiment, when fuel is added using the fuel addition valve 12 to reduce the NOx and SOx adsorbed by the NOx catalyst and the low-pressure EGR gas is recirculated through the low-pressure EGR passage 31, the amount of fuel to be added from the fuel addition valve 12 is reduced, which decreases the degree to which a fluctuation (decrease) in torque is reduced by the torque fluctuation reducing operation, and the second throttle valve 9 is controlled to reduce the amount of intake air to be supplied to the internal combustion engine 1. The decrease in torque of the internal combustion engine 1 from a steady state is compensated for by the assist of a motor 14 ["motor 14 is driven to compensate for the decrease in torque of the internal combustion engine 1 from a steady state.

According to the above method, because the amount of fuel that is added from the fuel addition valve 12 during a rich spike, during which the amount of fuel added by the fuel addition valve 12 is decreased to prevent a sudden change in oxygen concentration in the low-pressure EGR gas that is recirculated into the intake passage 3, unstable combustion in the internal combustion engine 1 is prevented and the degree of decrease in torque resulting from the addition of fuel from the fuel addition valve 12 is reduced. Because the degree of decrease in torque is reduced as described above, the torque of the internal combustion engine 1 may be stabilized even when the degree to which a fluctuation in torque is reduced by the torque fluctuation reducing operation is decreased. As a result, an increase of smoke from the internal combustion engine 1 and undesirable combustion noise resulting from performing a torque fluctuation reducing operation is prevented.

Figure 4:
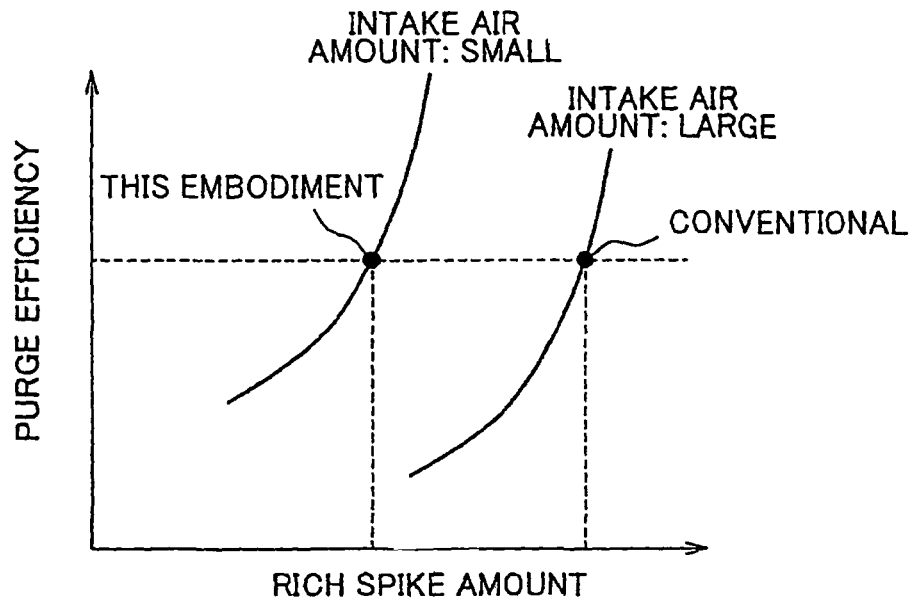
FIG. 4 is a graph showing the relation among the amount of fuel added, the amount of intake air and the NOx catalyst purge efficiency according to the second embodiment.

However, when the amount of fuel added during a rich spike is reduced, the amount of fuel that reaches on the NOx catalyst of the exhaust emission control system 10 decreases and the efficiency of purging and reducing adsorbed NOx and SOx from the NOx catalyst is reduced. Therefore, when the amount of fuel added during a rich spike is reduced, the second throttle valve 9 is controlled to reduce the amount of intake air that is supplied to the internal combustion engine 1 so that the flow rate of the exhaust gas flowing into the NOx catalyst of the exhaust emission control system 10 is decreased and the air-fuel ratio of the exhaust gas can be decreased. Then, the NOx catalyst of the exhaust emission control system 10 is sufficiently regenerated by the rich spike even with the reduced amount of fuel as shown in FIG. 4 and a desirable purge efficiency may be maintained.

The actual decrease in torque of the internal combustion engine 1 from that in a steady state is compensated for by driving of a motor 14. Thus, the total torque does not decrease even during the rich spike, and deterioration of drivability is prevented.

Figure 5:
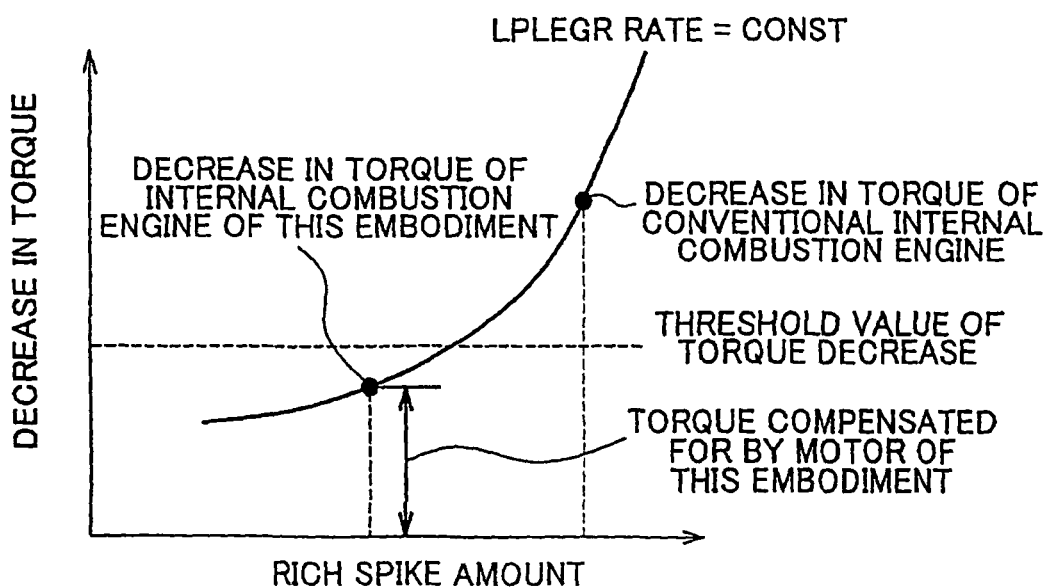
FIG. 5 is a graph showing the relation between the amount of fuel added and the decrease in torque according to the second embodiment.

More specifically, the decrease in torque of the internal combustion engine 1 resulting from the reduction in the amount of fuel added during the rich spike, the decrease in torque of the internal combustion engine resulting from executing a torque fluctuation reducing operation with a lower degree of reduction in a fluctuation in torque to reduce the fluctuation in torque, and the decrease in torque of the internal combustion engine 1 resulting from controlling the second throttle valve 9 to decrease the amount of intake air that is supplied to the internal combustion engine 1 are controlled such that the sum of the decreases in torque is equal to or smaller than a torque decrease threshold value, and the torque corresponding to the sum of the decreases in torque is compensated for by driving the motor 14 as shown in FIG. 5.

The torque decrease threshold value is the maximum amount by which the torque output may be decreased without causing a torque shock to occur. The above sum is equal to or smaller than the torque decrease threshold value, and no torque shock should occur even when the above control operation is performed. Also, because the torque corresponding to the sum of the decreases in torque is compensated for by driving the motor 14, the total torque is maintained and deterioration of drivability is prevented.

Figure 6:
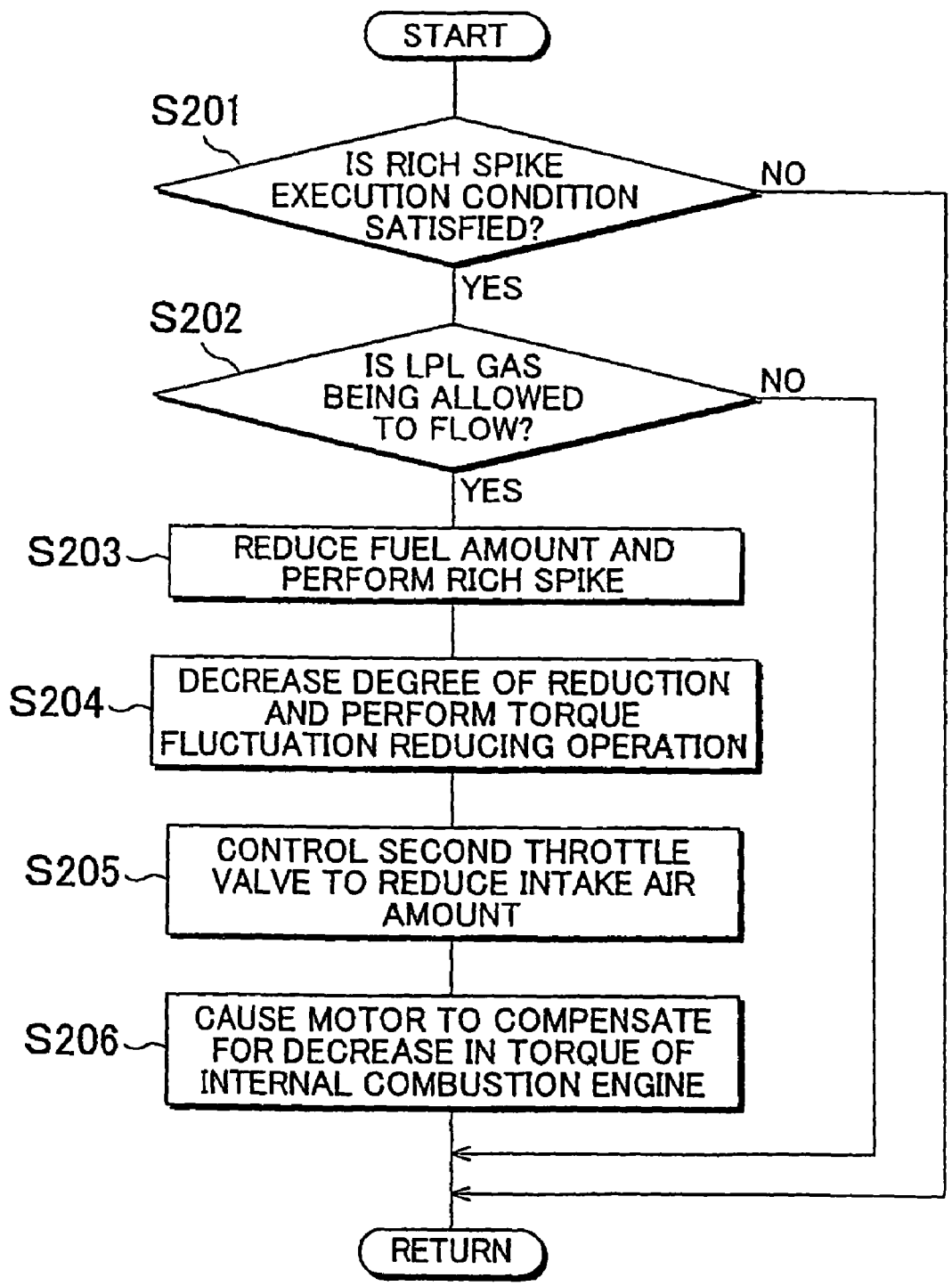
FIG. 6 is a flowchart of a control routine that is executed when a rich spike is performed, according to the second embodiment.

The control routine according to this embodiment, which is executed when a rich spike is performed, will now be described. FIG. 6 is a flowchart of the control routine executed when a rich spike is performed. This routine is repeated at specified time intervals. The ECU 13, which executes the routine, functions as the controller of the present invention.

In step S101, the ECU 13 determines whether the condition for executing a rich spike is satisfied. The condition for executing a rich spike is satisfied if the NOx catalyst of the exhaust emission control system 10 has adsorbed NOx and SOx to its full capacity and needs NOx reduction treatment or SOx poisoning recovery treatment.

If it is determined that the condition for execution of a rich spike is not satisfied in step S201, the ECU 13 terminates the routine. If it is determined that the condition for execution of a rich spike is satisfied, the routine proceeds to step S102.

In step S202, the ECU 13 determines whether the flow of low-pressure EGR gas through the low-pressure EGR passage 31 is stopped by detecting whether the low-pressure EGR valve 32 is open with an opening sensor (not shown) and the opening amount of the low-pressure EGR valve 32.

If it is determined that the low-pressure EGR valve 32 is closed to stop the flow of the low-pressure EGR gas in step S202, the ECU 13 terminates the current routine. If it is determined that the low-pressure EGR valve 32 is open to allow the low-pressure EGR gas to flow, the routine proceeds to step S203.

In step S203, the ECU 13 reduces the amount of fuel that is added from the fuel addition valve 12 and executes a rich spike. The reduction in the amount of fuel may be determined by empirical or other means.

Then, because the amount of fuel that is added from the fuel addition valve 12 during a rich spike is decreased to prevent a sudden change in oxygen concentration in the low-pressure EGR gas that is recirculated into the intake passage 3, unstable combustion in the internal combustion engine 1 may be prevented and the degree of decrease in torque resulting from the addition fuel from the fuel addition valve 12 is reduced.

Next, in step S204, the ECU 13 decreases the degree to which a fluctuation (decrease) in torque is reduced during a torque fluctuation reducing operation. That is, the ECU 13 reduces amount by which the timing of main fuel injection will be advanced or the pilot injection fuel amount is reduced to decreases the degree to which the fluctuation (decrease) in torque of the internal combustion engine 1 is reduced. The decrease in the degree to which a fluctuation (decrease) in torque is reduced by a torque fluctuation reducing operation may be determined by empirical or other means.

As a result, an increase of smoke exhausted from the internal combustion engine 1 and undesirable combustion noise resulting from the execution of the torque fluctuation reduction operation is prevented.

Next, in step S105, the ECU 13 controls the second throttle valve 9 to decrease the amount of intake air that is supplied to the internal combustion engine 1. The reduction in the amount of intake air may be determined by empirical or other means. The amount of intake air may be reduced using the first throttle valve 6, the low-pressure EGR valve 32, and the high-pressure EGR valve 42 in conjunction with the second throttle valve 9.

Therefore, because the amount of intake air that is supplied to the internal combustion engine 1 is decreased, the flow rate of exhaust gas introduced into the NOx catalyst of the exhaust emission control system 10 decreases, and the air-fuel ratio of the exhaust gas decreases. As a result, the NOx catalyst of the exhaust emission control system 10 is sufficiently regenerated by the rich spike even with the reduced amount of fuel because of the reduction in the amount of intake air, and a desirable purge efficiency is maintained.

Next, in step S106, the ECU 13 drives the motor 14 to compensate for the decrease in the torque of the internal combustion engine 1 from that in a steady state.

The total decrease in torque of the internal combustion engine 1 from the steady state is the sum of the change amount in torque that results from 1) the addition of the reduced amount of fuel during the rich spike, 2) the execution of the torque fluctuation reduction operation with a lower degree of reduction in a fluctuation in torque to reduce the fluctuation in torque, and 3) decreasing the amount of intake air that is supplied to the internal combustion engine 1, and that is equal to or smaller than a torque decrease threshold value, which is the maximum amount by which the torque may be decreased without causing a torque shock. The torque corresponding to the sum of the decreases in torque is compensated for by driving the motor 14.

Thus, the total torque does not decrease even during the rich spike, and deterioration of drivability is prevented.

The internal combustion engine control device according to the present invention is not limited to the above embodiments, and various modifications may be made to the embodiments without departing from the scope of the present invention.

The invention claimed is:

1. An internal combustion engine control device, comprising:
   a NOx adsorber catalyst disposed in an exhaust passage of an internal combustion engine;
   an EGR passage configured to draw a portion of exhaust gas from the exhaust passage, downstream of the NOx adsorber catalyst, and to recirculate the exhaust gas into an intake passage of the internal combustion engine;
   a reducing agent adding device configured to add a reducing agent to the exhaust gas upstream of the NOx adsorber catalyst to reduce substances adsorbed by the NOx adsorber catalyst;
   a torque fluctuation reducing device; and
   a fuel injection device configured to inject fuel into a cylinder of the internal combustion engine,
   wherein, when or after the reducing agent adding device adds the reducing agent, the torque fluctuation reducing device is configured to advance a timing of main fuel injection from the fuel injection device, or to carry out a pilot injection, to reduce fluctuation in torque of the internal combustion engine, and
   the reducing agent adding device is configured to reduce an amount of reducing agent that is added while the torque fluctuation reducing device is reducing the fluctuation in torque of the internal combustion engine by advancing the timing of main fuel injection from the fuel injection device, or carrying out the pilot injection.

2. The control device for the internal combustion engine according to claim 1, further comprising:
   an inhibiting device that inhibits the reducing agent adding device from adding the reducing agent,
   wherein the torque fluctuation reducing device reduces the fluctuation in torque of the internal combustion engine after the reducing agent adding device has added the reducing agent, and
   the inhibiting device inhibits the reducing agent adding device from adding the reducing agent while the torque fluctuation reducing device is reducing the fluctuation in torque of the internal combustion engine.

3. The control device for the internal combustion engine according to claim 1, further comprising:
   an electric motor configured to supplement the torque of the internal combustion engine, and
   a controller,
   wherein, when the exhaust gas is recirculated through the EGR passage and the reducing agent adding device adds the reducing agent, the controller i) reduces the amount of the reducing agent that is added, ii) decreases the degree to which the torque fluctuation reducing device reduces a fluctuation in torque, iii) reduces the amount of intake air that is supplied to the internal combustion engine, and iv) drives the electric motor to compensate for the resulting decrease in torque of the internal combustion engine.

4. The control device for the internal combustion engine according to claim 3, wherein:
   the controller controls a first torque change amount in which the controller reduces the torque of the internal combustion engine by decreasing the amount of reducing agent added by the reducing agent adding device; a second torque change amount in which the controller decreases the degree to which the torque fluctuation reducing device reduces fluctuation in torque of the internal combustion engine; and a third torque change amount in which the controller decreases the amount of intake air supplied to the internal combustion engine such that the sum of the first, second and third torque change amounts is equal to or smaller than a torque decrease threshold value, which is the maximum amount by which the torque output may be decreased without causing a torque shock, and
   the controller drives the electric motor to supplement the torque of the internal combustion engine to compensate for the total decrease in torque.

* * * * *